United States Patent
Franco et al.

(10) Patent No.: US 9,608,276 B2
(45) Date of Patent: Mar. 28, 2017

(54) NANOSTRUCTURED $Pt_xM_y$ CATALYST FOR PEMFC CELLS HAVING A HIGH ACTIVITY AND A MODERATE $H_2O_2$ PRODUCTION

(71) Applicant: Commissariat A L'Energie Atomique Et Aux Energies Alternatives, Paris (FR)

(72) Inventors: Alejandro Franco, Vaulnaveys le Haut (FR); Rodrigo Ferreira de Morais, Minas Gerais (BR); David Loffreda, Vaugneray (FR); Philippe Sautet, Saint Symphorien d'Ozon (FR)

(73) Assignee: Commissariat A L'Energie Atomique Et Aux Energies Alternatives, Paris (FR)

( * ) Notice: Subject to any disclaimer, the term of this patent is extended or adjusted under 35 U.S.C. 154(b) by 471 days.

(21) Appl. No.: 14/162,032

(22) Filed: Jan. 23, 2014

(65) Prior Publication Data

US 2014/0186744 A1 Jul. 3, 2014

Related U.S. Application Data

(63) Continuation of application No. PCT/FR2012/051723, filed on Jul. 20, 2012.

(30) Foreign Application Priority Data

Aug. 1, 2011 (FR) ..................... 11 57015

(51) Int. Cl.
*H01M 4/88* (2006.01)
*H01M 4/92* (2006.01)
(Continued)

(52) U.S. Cl.
CPC ............ *H01M 4/921* (2013.01); *B01J 23/42* (2013.01); *B01J 23/6522* (2013.01);
(Continued)

(58) Field of Classification Search
CPC ............ H01M 4/0421–4/0428; H01M 4/8657; H01M 4/8803–4/8814;
(Continued)

(56) References Cited

U.S. PATENT DOCUMENTS 4,366,041 A * 12/1982 Korach .................. C25B 13/00
204/252
2005/0251245 A1 * 11/2005 Sieradzki .................. A61F 2/86
623/1.39

(Continued)

FOREIGN PATENT DOCUMENTS

DE  10 2010 044 288 A1   3/2012
EP      1 524 711 A2      4/2005

OTHER PUBLICATIONS

Vojislav R. Stamenkovic et al., "*Improved Oxygen Reduction Activity on Pt3Ni(111) via Increased Surface Site Availability,*" Science, vol. 315, Jan. 26, 2007, pp. 493-497.

(Continued)

*Primary Examiner* — Jonathan Crepeau
*Assistant Examiner* — Jacob Buchanan
(74) *Attorney, Agent, or Firm* — Burr & Brown, PLLC

(57) ABSTRACT

A method of manufacturing a catalyst for a $Pt_xM_y$-based PEMFC, M being a transition metal, including the steps of: depositing $Pt_xM_y$ nanostructures on a support; annealing the nanostructures; depositing a $Pt_xM_y$ layer at the surface of the nanostructures thus formed; and chemically leaching metal M. It also aims at the catalyst obtained with this method.

21 Claims, 2 Drawing Sheets
(2 of 2 Drawing Sheet(s) Filed in Color)

(51) Int. Cl.
  *B01J 23/42* (2006.01)
  *B01J 23/652* (2006.01)
  *H01M 4/86* (2006.01)
  *H01M 8/1018* (2016.01)

(52) U.S. Cl.
  CPC ....... *H01M 4/8657* (2013.01); *H01M 4/8807* (2013.01); *H01M 4/8814* (2013.01); *H01M 4/8846* (2013.01); *H01M 4/8867* (2013.01); *H01M 4/8871* (2013.01); *H01M 4/8878* (2013.01); *H01M 4/8885* (2013.01); *H01M 4/925* (2013.01); *H01M 2004/8689* (2013.01); *H01M 2008/1095* (2013.01)

(58) Field of Classification Search
  CPC ................... H01M 4/8825–4/8871; H01M 4/8878–4/8889; H01M 4/9041–4/9058; H01M 4/92–4/921
  See application file for complete search history.

(56) References Cited

U.S. PATENT DOCUMENTS

| | | | | |
|---|---|---|---|---|
| 2006/0058185 | A1* | 3/2006 | Cendak | B01J 19/0046 502/326 |
| 2006/0280997 | A1* | 12/2006 | Yoo | H01M 4/926 502/326 |
| 2008/0020923 | A1* | 1/2008 | Debe | B01J 23/42 502/100 |
| 2009/0114061 | A1 | 5/2009 | Strasser et al. | |
| 2010/0086832 | A1* | 4/2010 | Lopez | B22F 1/0018 429/409 |
| 2010/0216632 | A1 | 8/2010 | Adzic et al. | |
| 2011/0086295 | A1 | 4/2011 | Lopez et al. | |

OTHER PUBLICATIONS

Romain Coulon et al., "Modeling Chemical Degradation of a Polymer Electrolyte Membrane and its Impact on Fuel Cell Performance," ECS Transactions, vol. 25, Issue 35, 2010, pp. 259-273 (Abstract).

Frederic Hasche et al., "Activity, Structure and Degradation of Dealloyed $PtNi_3$ Nanoparticle Electrocatalyst for the Oxygen Reduction Reaction in PEMFC," Journal of the Electrochemical Society, vol. 159, No. 1, Dec. 7, 2011, pp. B24-B33.

Vojislav R Stamenkovic et al., "Trends in Electrocatalysis on Extended and Nanoscale Pt-Bimetallic Alloy Surfaces," Nature Materials, vol. 6, No. 3, Mar. 1, 2007, pp. 241-243.

Vojislav R Stamenkovic et al., "Effect of Surface Composition on Electronic Structure, Stability, and Electrocatalytic Properties of Pt-Transition Metal Alloys: Pt-Skin versus Pt-Skeleton Surfaces," Journal of the American Chemical Society, Aug. 2006, vol. 28, No. 7, pp. 8813-8819.

International Search Report dated Oct. 16, 2012.

* cited by examiner

NANOSTRUCTURED $Pt_xM_y$ CATALYST FOR PEMFC CELLS HAVING A HIGH ACTIVITY AND A MODERATE $H_2O_2$ PRODUCTION

BACKGROUND OF THE INVENTION

1. Field of the Invention

The present invention relates to the field of proton-exchange membrane fuel cells (PEMFCs).

It provides a solution enabling to limit the production of $H_2O_2$ during the use of bimetal $Pt_xM_y$-type catalysts in the cathodes of PEM-type fuel cells, and this due to the forming of a nanostructured catalyst according to the invention.

2. Description of Related Art

PEMFCs are current generators having their operating principle, illustrated in FIG. 1, based on the conversion of chemical energy into electrical energy, by catalytic reaction of hydrogen and oxygen.

Membrane-electrode assemblies or MEAs 1, commonly called cell cores, form the basic elements of PEMFCs. They are formed of two electrodes (anode and cathode, respectively) separated by a polymer membrane 2, said membrane 2 being in direct contact with the catalytic layer (3, 4, respectively) present on each electrode. Thus, membrane 2 enables to separate anode and cathode compartments 5 and 6.

Catalytic layers 3, 4 are generally formed of platinum (Pt) nanoparticles supported by carbon clusters. Gas diffusion layers 7, 8 (carbon fabric, felt . . . ) are arranged on either side of MEA 1 to ensure the electric conduction, the homogeneous reactive gas distribution, and the discharge of products. A system of channels 9, 10 placed on each side of the MEA transport the reactive gases and discharge to the outside the excess water and gases.

At anode 3, the oxidation of hydrogen on the catalyst generates protons $H^+$ and electrons $e^-$. The protons then cross polymer membrane 2 before reacting with oxygen at cathode 4. The reaction of the protons with oxygen at the cathode (ORR, for "Oxygen Reduction Reaction") causes the forming of water, of a little hydrogen peroxide ($H_2O_2$), and the production of heat. Improving the lifetime and decreasing the costs of PEMFCs are a major issue for the use and the development of cells for the consumer market. Therefore, identifying and understanding cell core aging phenomena are now essential.

$Pt_xM_y$-type nanoparticles, M being a transition metal element (for example, Ni, Fe, Co, Cr), are alternative catalysts advantageous for the ORR reaction occurring at the cathode of PEMFCs (Stamenkovic B. et al., SCIENCE, 315, 2007, 493; Stamenkovic B. et al., J. AM. CHEM. SOC., 128, 2006, 8813-8819). Such bimetal catalysts, associating a second metal, less expensive than platinum, also enable to decrease the general cost of the catalyst. However, they have the specificity of increasing the production of hydrogen peroxide ($H_2O_2$), a by-product of the reaction with water, during the operation of PEMFCs.

Now, hydrogen peroxide is one of the chemical agents responsible for the degradation of membrane 2 by a method called Fenton reaction. It results from the dissociation of hydrogen peroxide into a radical and an ion, catalyzed by metal ions $Fe^{2+}$ or $Fe^{3+}$ generated by the corrosion of the bipolar plates:

$$H_2O_2 + Fe^{2+} \rightarrow Fe^{3+} + HO\cdot + OH^-$$

$$H_2O_2 + Fe^{3+} \rightarrow Fe^{2+} + HOO\cdot + H^+$$

$$HOO\cdot + Fe^{3+} \rightarrow Fe^{2+} + O_2 + H^+$$

$$H_2O_2 + HO\cdot \rightarrow H_2O + HOO\cdot$$

$$HO\cdot + Fe^{2+} \rightarrow Fe^{3+} + OH^-$$

The oxygen radical formed during the decomposition etches the proton-conducting polymer, thus degrading membrane 2 via complex chemical reactions (Romain Coulon et al. ECS Trans. 25 (35), 2010, 259-273).

SUMMARY OF THE INVENTION

The principle of the invention is based on a theoretical analysis of the reaction mechanism of the forming of water and of hydrogen peroxide on a model $Pt_3Ni(111)$ catalytic surface (called "Pt-skeleton"), by means of calculations using the density functional theory. The corresponding scientific results show (FIG. 2), that the forming of hydrogen peroxide ($H_2O_2$) on such a well-structured bimetal catalyst has a general positive or endothermic thermodynamic barrier (associated with a significant energy cost), conversely to the forming of water, which is exothermic (lower energetic cost). In other words, this "Pt-skeleton" type bimetal catalyst has the specificity of significantly decreasing the hydrogen peroxide selectivity, and this, via its particular morphology having vacancies in the nickel second metal surface, according to a regular network. It has also been observed that there are no active sites for the ORR reaction within these vacancies. In such conditions, the forming of $H_2O_2$ thus seems to be improbable or at least strongly decreased.

The present invention thus relates to a quite original approach to protect the membrane and thus increase its lifetime in a PEMFC. The above-described specific catalytic structure is here intended to be imitated, to decrease the forming of $H_2O_2$ while preserving ORR activity (forming of water from oxygen and protons).

To manufacture a catalyst nanostructured in this way, three different techniques have to be combined: an anneal followed by a MOCVD ("MetalloOrganic Chemical Vapor Deposition"), and then by a chemical leaching (extraction of the second metal from the surface via the electrolyte).

In other words, and according to a first aspect, the present invention relates to a method of manufacturing a catalyst for $Pt_xM_y$-based PEMFC, comprising the steps of:
- depositing $Pt_xM_y$ nanostructures on a support;
- annealing the nanostructures;
- depositing a $Pt_xM_y$ layer above the nanostructures thus formed;
- chemically leaching metal M.

In a first case, the support corresponds to the gas diffusion layer. In known fashion, such a layer is typically made of carbon and conventionally has a thickness in the order of 200 micrometers.

However, this layer may be sensitive to heat and thus potentially damaged by the temperatures imposed during the anneal. In this case, the nanostructures are deposited on a support which is a heat-resistant substrate, such as a silica layer. After anneal, the nanostructures should then be transferred onto the gas diffusion layer. Such a transfer may be performed by detaching the nanostructures from the first support by means of an electrolyte, and then by impregnating the gas diffusion layer with these nanostructures.

Thus, and according to this specific embodiment, the method according to the invention comprises an additional step of transferring, after anneal, the nanostructures onto the gas diffusion layer.

In the framework of the invention, M is a transition metal, advantageously selected from among nickel (Ni), iron (Fe), cobalt (Co), or chromium (Cr). M has the same chemical nature at the two deposition steps (nanostructures, and then layer). However, a catalyst containing several transition metals of different natures can be envisaged (multi-metal material).

In formula $Pt_xM_y$, x and y stand for the stoichiometries of platinum and of the transition metal, respectively. In a preferred embodiment, $Pt_xM_y$ stands for $Pt_3Ni$, with x=3 and y=1, respectively.

The first step of the method thus corresponds to the deposition on a support of $Pt_xM_y$ nanostructures. In the context of the invention, "nanostructures" designates structures having a size smaller than 10 nanometers. In a specific case, the nanoparticles have a spherical shape, defined by their diameter smaller than 10 nanometers. As a variation, they may be rods having their largest dimension smaller than 10 nanometers.

Advantageously, this deposition is performed by cathode sputtering ("ion beam sputtering" or IBS). As a variation, such nanostructures are formed by chemical synthesis, advantageously by means of liquid-phase precursors and at low temperature.

In practice, the Pt and M atoms are deposited on the substrate by using a nanocluster source to form $Pt_xM_y$ nanostructures, for example, with a 30-minute exposure time.

The next step comprises annealing these nanostructures. This step aims at generating nanostructures having a so-called "core/shell" morphology. The fact of concentrating metal M on the nanostructure core enables to increase the catalyst stability.

The anneal temperature especially depends on the size of the nanostructures but should not affect the integrity of the support. The anneal is generally performed at a temperature in the range from 600° C. to 1,200° C., advantageously in the range from 700° C. to 800° C. The anneal generally lasts for one hour.

The next step comprises depositing a $Pt_xM_y$ layer above or at the surface of the nanostructures obtained at the end of the first step. A homogeneous monolayer having a homogeneous stoichiometry ("bulk-truncated layer") is intended to be obtained. In other words, the nanostructures are desired to be coated by means of this layer.

A technique particularly adapted for this deposition is the MOCVD ("MetalloOrganic Chemical Vapor Deposition") technique. Such a technique requires using adapted organo-metallic precursors. For examples, the precursors for a platinum and cobalt deposition may be dimethyl(1,5-cy-clooctadiene) platinum(II) $[Pt^{II}(Me_2,cod), Strem]$ cobalt(III) acetylacetonate $[Co^{III}(acac)_3, Strem]$, solubilized in toluene, with concentrations lower than 0.03 M.

The temperature of the MOCVD step especially depends on the nature of the organometallic precursors in presence, but is generally in the range from 200° C. to 400° C., advantageously in the order of 300° C.

As a variation, and as in the first step relative to the deposition of nanostructures, this deposition may be performed by cathode sputtering ("ion beam sputtering" or IBS).

The final step comprises performing a chemical leaching of metal M, to form vacancies or cavities in the $Pt_xM_y$ layer.

Such a partial removal of metal M may for example be performed by immersion in a liquid electrolyte, especially in an acid such as sulphuric acid ($H_2SO_4$), for example, at a 0.1-M concentration for 1 hour.

Such a chemical leaching of metal M in the layer is advantageously controlled to produce structured vacancies or cavities, having a size which does not exceed 6 Angströms. Indeed, larger cavities are capable of providing active sites for the production of hydrogen peroxide.

Preferably, the vacancies formed at the end of the leaching step have a size in the range between 2 and 6 Angströms.

According to another aspect, the invention provides a novel nanostructured catalyst which combines the advantages of pure $Pt_xM_y$ core/shell nanostructures (providing an ORR activity greater than that of pure Pt, with a good stability) and a $Pt_xM_y$ layer with vacancies (decreasing the production of $H_2O_2$).

In other words, the present invention provides a catalyst capable of being obtained by means of the above-described method, said catalyst comprising core/shell nanostructures made of $Pt_xM_y$ covered with a $Pt_xM_y$ layer comprising vacancies.

In the context of the invention, such vacancies or cavities are not through and thus do not emerge onto the gas diffusion layer. Further, and as already mentioned, their size (which can here be identified with their diameter) advantageously does not exceed from 5 to 6 Angströms, with a size advantageously in the range from 2 to 6 Angströms.

As already mentioned, such a catalyst is particularly advantageous in the case of PEMFC-type fuel cells, in particular at the cathode of such cells. However, it can be envisaged to provide a cell provided with a catalyst according to the invention both at the cathode and at the anode.

As known, the leaching occurs directly on the cathode and/or on the anode of the cell, before its assembly in the MEA. This enables to ensure the efficiency and the control of the leaching.

Thus, the present invention provides a method of improving the lifetime of a PEMFC-type fuel cell, comprising using as a catalyst, at least at its cathode, an active material such as previously described. As demonstrated in the context of the present application, this results in a decrease of the production of $H_2O_2$.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing features and advantages will now be discussed in the following non-limiting description of a specific embodiment, in relation with the accompanying drawings, among which.

DETAILED DESCRIPTION OF THE INVENTION

Figure 1:
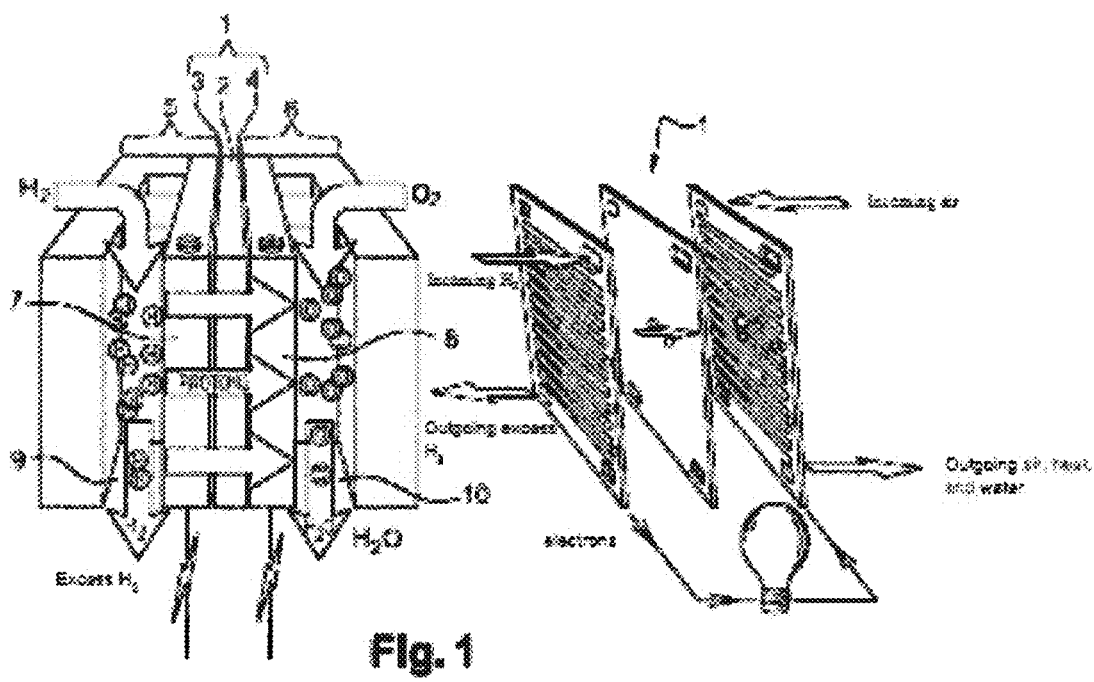
FIG. 1 shows the diagram of the operating principle of a PEMFC-type fuel cell.
Figure 2:
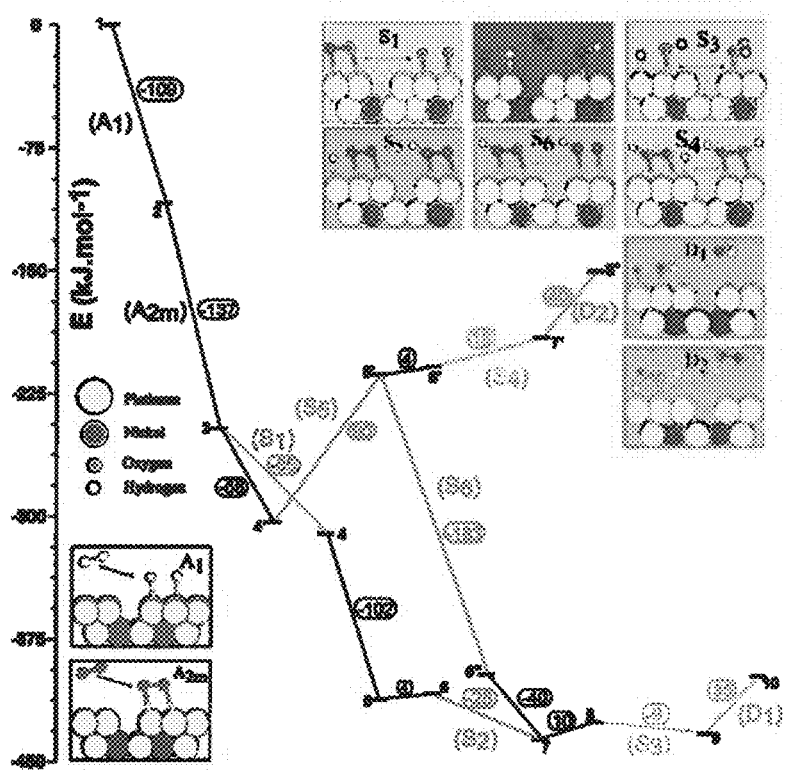
FIG. 2 shows the thermodynamic energy profile for the forming of $H_2O$ and $H_2O_2$ on a $Pt_3Ni(111)$ surface of "Pt-skeleton" type, determined from calculations using the density functional theory in periodic conditions. S5 shows the step of forming the hydroperoxyl (OOH), which is the surface precursor species for the forming of hydrogen peroxide $H_2O_2$.
Figure 3:
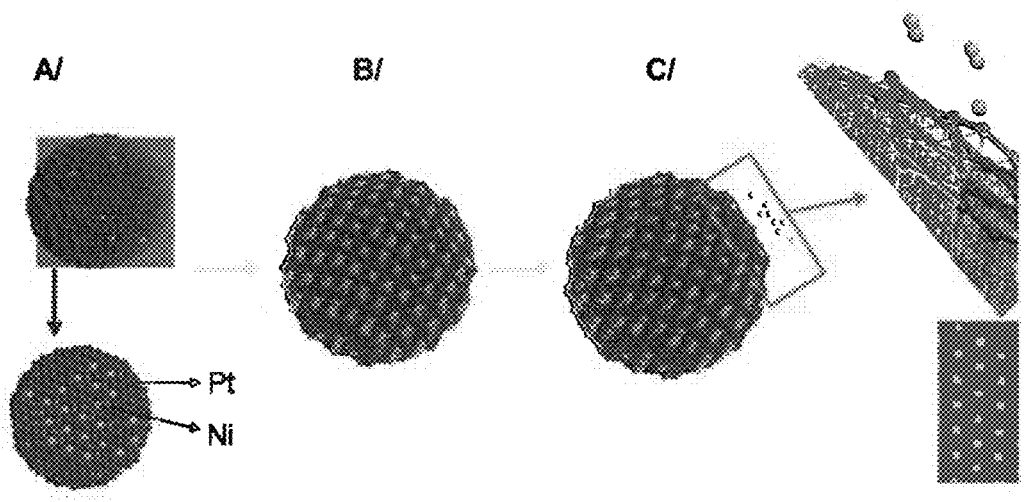
FIG. 3 shows the different steps implemented for the manufacturing of a nanostructured catalyst according to the invention: A/ anneal; B/ deposing the $Pt_3M$ layer by the MOCVD technique; C/ chemically leaching metal M.

Comparative experiments have been made in a PEMFC containing either:

a membrane in the presence of a cathode with a Pt₃Ni core/shell structure;

or a membrane in the presence of a cathode with a nanostructured Pt₃Ni catalyst according to the invention, in particular according to the method illustrated in FIG. 3.

Figure 4:
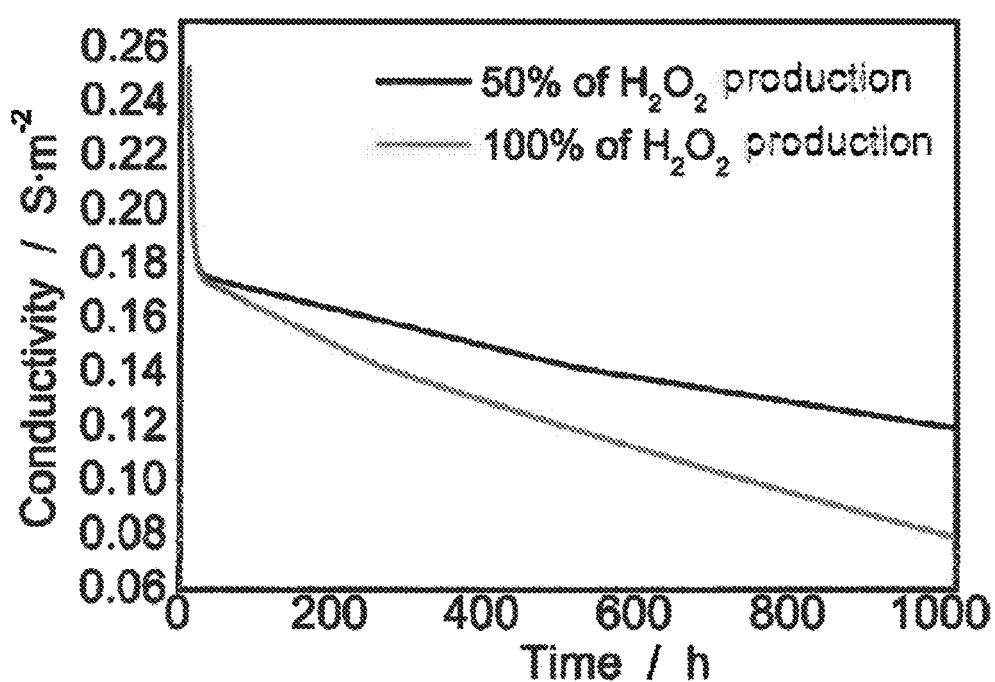
FIG. 4 shows the variation of the membrane conductivity along time for 2 different $H_2O_2$ production rates (100% and 50%, respectively).

The results are shown in FIG. 4.

In the first case, the membrane has a durability (80% loss of protonic conductivity) of approximately 1,000 hours in OCV conditions ("Open Circuit Voltage": temperature=80° C.; relative humidity of the anode and of the cathode=80%; anode and cathode pressure: 1.5 bar; PtNi filling: 0.3 mg·cm$^{-2}$ in the anode and 0.6 mg·cm$^{-2}$ in the cathode; membrane thickness: 25 μm; active surface area: 25 cm²).

In the same conditions, the nanostructured Pt₃Ni catalyst according to the invention enables to decrease by 50% the production of $H_2O_2$. Further, after 1,000 hours of operation, the membrane conductivity is approximately doubled, which extends by approximately 500 hours the cell lifetime (defined herein as the time required for the cell potential to become zero).

The invention claimed is:

1. A method of manufacturing a catalyst for a $Pt_xM_y$-based PEMFC, M being a transition metal, comprising the steps of:
   depositing a first layer of $Pt_xM_y$ nanostructures on a support;
   annealing the nanostructures;
   depositing a second $Pt_xM_y$ layer at the surface of the nanostructures thus formed; and
   producing structured vacancies or cavities, having a size which does not exceed 6 Angströms, at the surface of the second $Pt_xM_y$ layer, by controlled chemical leaching of metal M.

2. The method of manufacturing a catalyst for a PEMFC of claim 1, wherein the support is a gas diffusion layer of the PEMFC.

3. The method of manufacturing a catalyst for a PEMFC of claim 2, wherein the gas diffusion layer has a thickness of 200 micrometers.

4. The method of manufacturing a catalyst for a PEMFC of claim 1, wherein the support is not a gas diffusion layer of the PEMFC, and wherein after annealing, the nanostructures are transferred onto the gas diffusion layer of the PEMFC.

5. The method of manufacturing a catalyst for a PEMFC of claim 1, wherein metal M is selected from the group consisting of Ni, Fe, Co, and Cr.

6. The method of manufacturing a catalyst for a PEMFC of claim 5, wherein the catalyst is formed with Pt₃Ni.

7. The method of manufacturing a catalyst for a PEMFC of claim 1, wherein the deposition of nanostructures is performed by cathode sputtering.

8. The method of manufacturing a catalyst for a PEMFC of claim 1, wherein the anneal is performed at a temperature in a range of 600° C. to 1,200° C.

9. The method of manufacturing a catalyst for a PEMFC of claim 8, wherein the anneal is performed for a 1-hour duration.

10. The method of manufacturing a catalyst for a PEMFC of claim 1, wherein the deposition of the $Pt_xM_y$ layer is performed by MOCVD.

11. The method of manufacturing a catalyst for a PEMFC of claim 10, wherein the MOCVD is performed by means of organometallic precursors of platinum and of the metal.

12. The method of manufacturing a catalyst for a PEMFC of claim 11, wherein the MOCVD is performed at a temperature in a range of 200° C. to 400° C.

13. The method of manufacturing a catalyst for a PEMFC of claim 12, wherein the MOCVD is performed at a temperature of 300° C.

14. The method of manufacturing a catalyst for a PEMFC of claim 1, wherein the chemical leaching of metal M is performed by immersion in a liquid electrolyte.

15. The method of manufacturing a catalyst for a PEMFC of claim 14, wherein the liquid electrolyte is $H_2SO_4$.

16. The method of manufacturing a catalyst for a PEMFC of claim 14, wherein the chemical leaching is performed for 1 hour.

17. A catalyst capable of being obtained by means of the method of claim 1, said catalyst comprising core/shell nanostructures made of $Pt_xM_y$, covered with a $Pt_xM_y$ layer comprising vacancies.

18. The catalyst of claim 17, wherein the vacancies have a size in the range from 2 to 6 Angströms.

19. A PEMFC-type fuel cell comprising at least at one of its electrodes the catalyst of claim 17.

20. A method of improving the lifetime of a PEMFC-type fuel cell comprising using as a catalyst, at least at its cathode, the catalyst of claim 17.

21. A PEMFC-type fuel cell comprising as its cathode the catalyst of claim 17.

* * * * *